US012694001B2

(12) United States Patent
Fanghaenel et al.

(10) Patent No.: US 12,694,001 B2
(45) Date of Patent: Jul. 28, 2026

(54) DATABASE UPGRADE SELECTION BASED ON DATABASE CATALOG SIGNATURES

(71) Applicant: Salesforce, Inc., San Francisco, CA (US)

(72) Inventors: Thomas Fanghaenel, Oakland, CA (US); Kaushal Mittal, Mountain House, CA (US); David Gershuni, Carmel, IN (US); Sanjib Ghosh, El Segundo, CA (US); Mikhail Lychagin, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 24 days.

(21) Appl. No.: 18/428,647

(22) Filed: Jan. 31, 2024

(65) Prior Publication Data

US 2025/0245206 A1     Jul. 31, 2025

(51) Int. Cl.
*G06F 16/21* (2019.01)
*G06F 16/22* (2019.01)
*G06F 16/23* (2019.01)

(52) U.S. Cl.
CPC .......... *G06F 16/213* (2019.01); *G06F 16/219* (2019.01); *G06F 16/2255* (2019.01); *G06F 16/2358* (2019.01)

(58) Field of Classification Search
None
See application file for complete search history.

(56) References Cited

U.S. PATENT DOCUMENTS

| | | | | |
|---|---|---|---|---|
| 9,535,934 | B1 * | 1/2017 | Bahl | G06F 16/214 |
| 10,977,275 | B1 | 4/2021 | Bauer et al. | |
| 11,526,465 | B2 | 12/2022 | Shetty et al. | |
| 11,709,808 | B1 * | 7/2023 | Dageville | G06F 16/221 |
| | | | | 707/803 |
| 11,775,560 | B1 * | 10/2023 | Hoffmann | G06F 16/273 |
| | | | | 707/615 |
| 12,321,322 | B2 * | 6/2025 | Scott, Jr. | G06F 16/214 |
| 2007/0288495 | A1 | 12/2007 | Narasayya et al. | |
| 2008/0098046 | A1 * | 4/2008 | Alpern | G06F 16/217 |
| | | | | 707/999.203 |

(Continued)

*Primary Examiner* — Aleksandr Kerzhner
*Assistant Examiner* — Anugeetha Kunjithapatham
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that pertain to upgrading a database application. A computer system may determine to upgrade a database application from a current version associated with a first instance of a database catalog that defines the structure of a database that is managed by that database application. The first instance is associated with a first catalog signature that is indicative of the first instance of the database catalog. The computer system generates a second catalog signature that is indicative of a second instance of the database catalog that is associated with the different version. The computer system compares the first catalog signature and the second catalog signature to determine whether the database catalog changes between the current and different versions. Based on the comparing, the computer system then selects one of multiple upgrade processes performable to upgrade the database application to the different version and performs the selected upgrade process.

14 Claims, 10 Drawing Sheets

(56) References Cited

U.S. PATENT DOCUMENTS

| | | | |
|---|---|---|---|
| 2010/0114832 A1 | 5/2010 | Lillibridge et al. | |
| 2014/0040203 A1* | 2/2014 | Lu ........................... | G06F 16/27 |
| | | | 707/634 |
| 2014/0337282 A1* | 11/2014 | Mesika ................... | G06F 16/21 |
| | | | 707/609 |
| 2015/0248404 A1 | 9/2015 | Pazdziora et al. | |
| 2018/0129585 A1 | 5/2018 | Martin et al. | |
| 2022/0156277 A1* | 5/2022 | Beier ...................... | G06F 16/27 |
| 2023/0334031 A1* | 10/2023 | Acker ................. | G06F 16/2329 |
| 2024/0333517 A1* | 10/2024 | Scott, Jr. ............... | H04L 9/3247 |
| 2024/0354290 A1* | 10/2024 | Scott, Jr. .............. | G06F 16/214 |

* cited by examiner

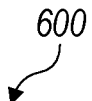

*600*

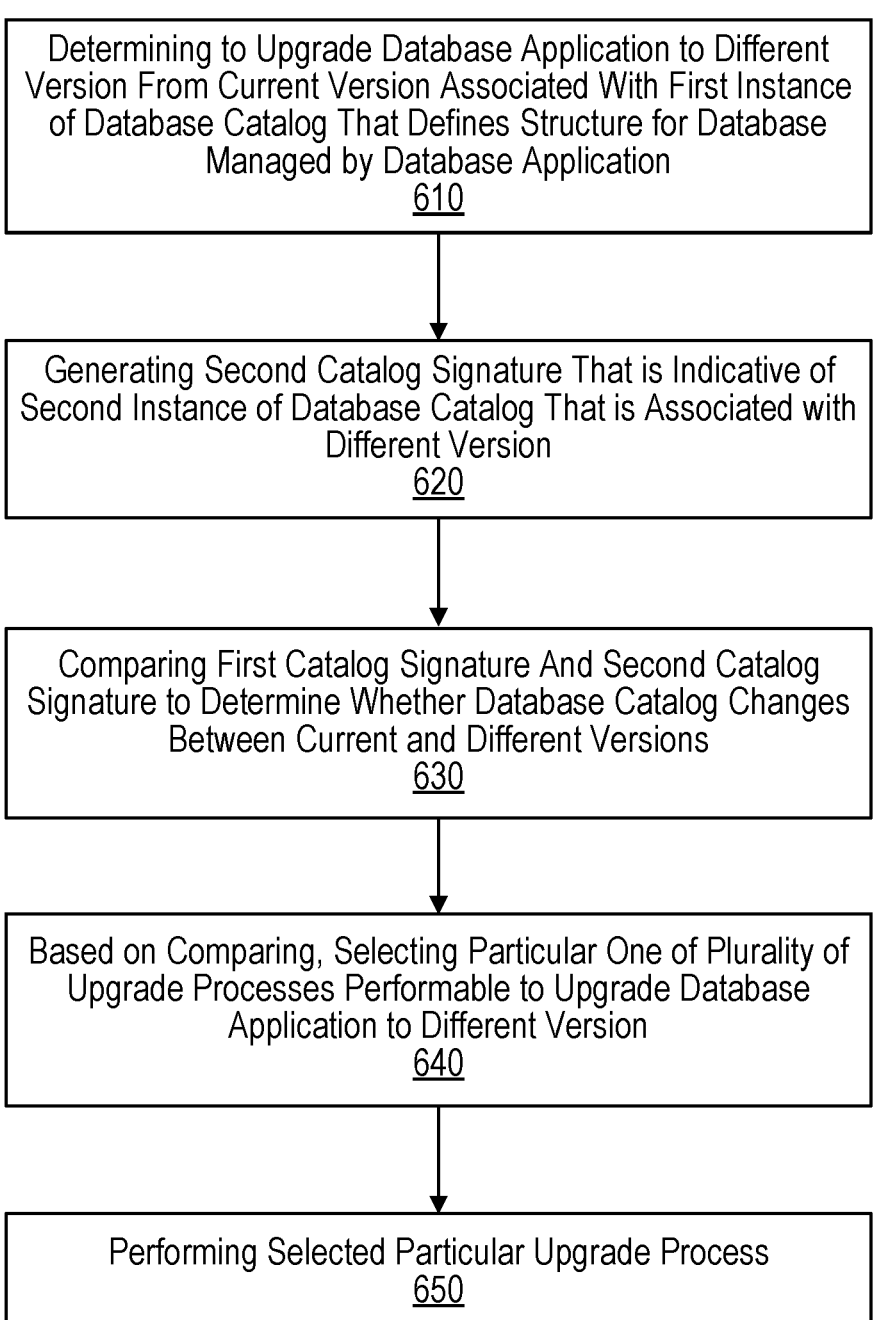

Determining to Upgrade Database Application to Different Version From Current Version Associated With First Instance of Database Catalog That Defines Structure for Database Managed by Database Application
610

Generating Second Catalog Signature That is Indicative of Second Instance of Database Catalog That is Associated with Different Version
620

Comparing First Catalog Signature And Second Catalog Signature to Determine Whether Database Catalog Changes Between Current and Different Versions
630

Based on Comparing, Selecting Particular One of Plurality of Upgrade Processes Performable to Upgrade Database Application to Different Version
640

Performing Selected Particular Upgrade Process
650

FIG. 6

DATABASE UPGRADE SELECTION BASED ON DATABASE CATALOG SIGNATURES

BACKGROUND

Technical Field

This disclosure relates generally to database systems and, more specifically, to various mechanisms that pertain to upgrading a database application.

Description of the Related Art

Enterprises routinely implement database management systems (or, simply "database systems") that enable users to store data in an organized manner that can be efficiently accessed and manipulated. The stored data is organized, often in the form of database tables, according to a database catalog (alternatively referred to as a "database schema") that defines the structure of the database by defining tables, columns, data types, relationships, constraints, etc. During its operation, a database system can receive requests from users via applications or from other systems, such as another database system, to perform database transactions on the data that is stored in the database. As a part of performing the database transactions, the database system accesses the database catalog to understand the structure of the database so that it may correctly store, manipulate, and/or read data. The database catalog is used throughout the database's life, serving as a blueprint that informs interactions with the database by the database system.

BRIEF DESCRIPTION OF THE DRAWINGS

FIG. 6 is a flow diagram illustrating an example method that pertains to selecting an upgrade process based on a comparison of catalog signatures, according to some embodiments.

DETAILED DESCRIPTION

Figure 1:
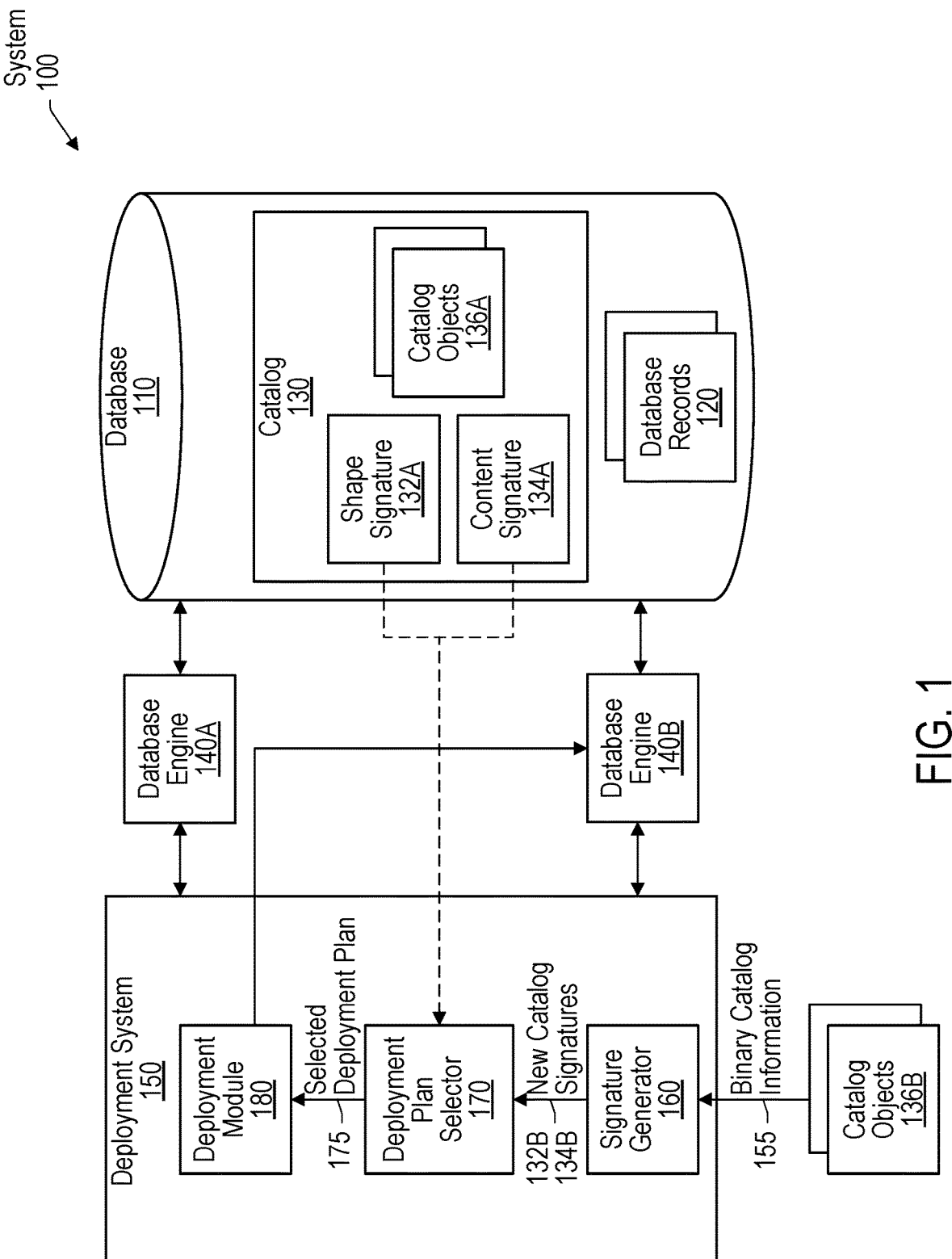
FIG. 1 is a block diagram illustrating example elements of a system that comprises a deployment system that selects and executes a deployment plan based on catalog signatures, according to some embodiments.

Companies routinely rely on database systems to manage databases that store data (e.g., user and company data) that is organized in a manner that can allow for access, storage, and/or manipulation of that data by those database systems. A database system can operate as a service that processes database transactions for users, applications (e.g., a web application), and other systems. The database system is associated with a database catalog that it uses when processing the database transactions. The database catalog comprises various tables (forming the structure of the database catalog) that store content that describes the structure of the database, such as database tables that are used to store user data. The catalog objects that constitute the database catalog are referred to as the "structure" of the database catalog while the content stored in the catalog objects is referred to as the "content" of the database catalog.

Updates to the database system (its database application) or to other components, such as an application that interacts with the database system), may include changes to the structure and/or content of the database catalog. For example, a new column may be added to a table of the database catalog as a part of an update, and as a result, the structure of the database catalog changes. When the structure changes, a full upgrade is performed (to instantiate the updated database system) in which the entire database catalog is rebuilt. For example, in the case of a column being added to a particular table of the database catalog, the entire catalog is rebuilt, regardless of whether other tables within the catalog are unchanged. But rebuilding the catalog is a time-consuming process. In conventional approaches, whenever there is a major or minor version update to the database system, the full upgrade is performed independent of whether the structure or the content of the database catalog actually changed—that is, the full upgrade is performed even in cases in which it is not needed. As a result, updating the database system is a time consuming process and disruptive to production databases. This disclosure addresses, among other things, the technical problem of how to determine if the structure and/or content of the database catalog changes between versions of the database system and how to upgrade the database system based on that determination.

In various embodiments described below, a computer system implements a deployment system that determines, when a new version of a database system is to be deployed, whether the structure and/or content of a database catalog has changed between versions of the database system using catalog signatures and selects a deployment plan to execute based on whether the structure and/or the content changed. As a part of determining if the catalog has changed, the deployment system may generate shape and content signatures associated with the new version of the database system. The catalog shape signature, in various embodiments, is indicative of the shape/structure of the catalog and can be derived by performing a hash function on a set of files associated with data that defines the structure of the database catalog. The catalog content signature, in various embodiments, is indicative of the catalog's content (e.g., rows in the tables of the catalog) and can be derived by performing a hash function on a set of files pertaining to the content of the database catalog.

After generating the catalog shape and content signatures, in various embodiments, the deployment system compares those signatures associated with the newer version of the catalog with shape and content signatures associated with the current version. If the shape signatures differ between versions of the database catalog, this indicates that the structure of the catalog changes between those versions. Accordingly, in various embodiments, the deployment system selects a deployment plan that corresponds to the full upgrade process in which the catalog is rebuilt through SQL statements. The full upgrade may be the slowest deployment plan. If the shape signatures do not differ but the content signatures differ, this indicates that the content of the catalog changes between the versions. As such, in various embodiments, the deployment system selects a second deployment plan that corresponds to a minor upgrade process in which at least a portion of the existing database catalog (associated with the current version) is reused (e.g., copied). This minor upgrade process is faster than the full upgrade as it does not involve rebuilding the catalog. Finally, if the shape signatures and the content signatures respectively match between the versions of the database catalog, this indicates that both the structure and the content remain unchanged between the versions. Accordingly, in various embodiments, the deployment system selects a third deployment plan that corresponds to a binary swap process in which the new version of the database system is spun up to use the existing database catalog (associated with the current version). This binary swap process may be the fastest deployment plan.

These techniques may be advantageous over prior approaches as these techniques allow for faster upgrades of a database system and thus reduce the down time of the database system and access to the database. In particular, changes to the catalog can be uncommon relative to the total number of updates to the database system and thus being able to select an appropriate upgrade process for a given upgrade can reduce the downtime of the database system. That is, in the disclosed techniques, a system can select from at least three different deployment plans depending on whether there is a change and the type of change to the catalog between versions of the database system. As a result, the fastest upgrade option can be selected based on whether there is a change and the type of change instead of always performing the full upgrade process. As an example, if there is no change to the catalog, then the system can simply "swap" out the database application binaries without making major changes to the catalog.

Turning now to FIG. 1, a block diagram of a system 100 is shown. System 100 includes a set of components that may be implemented via hardware or a combination of hardware and software. In the illustrated embodiment, system 100 includes a database 110, database engines 140A and 140B, and a deployment system 150. As shown, database 110 includes database records 120 and a database catalog 130 comprising a shape signature 132A, a content signature 134A, and catalog objects 136A. Also as shown, deployment system 150 includes a signature generator 160, a deployment plan selector 170, and a deployment module 180. In some embodiments, system 100 is implemented differently than shown. For example, a portion or all of deployment system 150 may be a subcomponent of a database engine 140, and shape signature 132A and content signature 134A may be stored separately from catalog 130.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure provided by a cloud provider. Database 110, database engines 140A and 140B, and deployment system 150 may execute on and/or utilize the available cloud resources of that cloud infrastructure (e.g., computing resources, storage resources, etc.) to facilitate their operation. For example, software for implementing deployment system 150 may be stored on a non-transitory computer-readable medium of server-based hardware included in a datacenter of the cloud provider and executed in a virtual machine hosted on that hardware. But in some embodiments, system 100 is implemented utilizing a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that allow database engines 140 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In various embodiments, data written to database 110 by a database engine 140 deployed to a database node is accessible to other database nodes (e.g., other instances of that database engine 140) within a multi-node configuration. The data may include database records 120 that comprise key-value pairs having data and a corresponding key that can be used to look up the associated record. For example, a database record 120 may correspond to a row in a database table and specify values for one or more attributes/fields of that table. Database 110 also stores database catalog 130.

Database catalog 130, in various embodiments, is metadata that describes various types of database objects associated with database 110, such as tables, indexes, procedures, triggers, views, and functions. Accordingly, database catalog 130 may be used by database engines 140 to access, interpret, and maintain data included in database 110. In the illustrated embodiment, database catalog 130 stores catalog objects 136A (e.g., catalog tables that form the structure of database catalog 130) having content that describes the various types of database objects (e.g., tables, indexes, stored procedures, sequences, and views, which can be used in a PostgreSQL-based database) associated with database 110. For example, a particular catalog object 136A of database catalog 130 may be a catalog table whose content specifies one or more database tables used to store user data. In various embodiments, a database engine 140 relies on catalog objects 136 and their content to execute queries against database 110 for records 120. Schema updates to catalog 130 may change its structure (catalog objects 136A) and/or content-those updates may be received as a part of an update to a database engine 140 (e.g., database engine 140A in FIG. 1). As depicted, database catalog 130 includes shape signature 132A and content signature 134A.

A shape signature 132, in various embodiments, is a value that represents the structure (or shape) of a version of catalog 130. A shape signature 132 may be generated using a hash function on information that is based on, or otherwise derived from, the catalog objects 136 of a version of catalog 130. As an example, shape signature 132A may represent catalog objects 136A and may be generated based on information defining catalog objects 136A, while shape signature 132B may represent catalog objects 136B that are associated with another version of catalog 130. A content signature 134, in various embodiments, is a value that represents the content inserted into the catalog objects 136 of a version of catalog 130. A shape signature 132 may also be generated using a hash function on information that is based on, or otherwise derived from, that content. For example, content signature 134A may represent the content of catalog objects 136A. For example, a particular catalog object 136A may be a table that stores records (rows) defining various database tables used to store user data, and content signature 134A may represent records inserted into that catalog table. As shown, shape signature 132A and content signature 134A are accessible by deployment module 180.

A database engine 140 (alternatively referred to as a "database application"), in various embodiments, is executable software that provides database services, such as data storage, data retrieval, and data manipulation. Those database services may be provided to other components in system 100 or to components external to system 100. As an example, a database engine 140 may receive a request from an application server to perform a database transaction. A database transaction, in various embodiments, is a logical unit of work (e.g., a specified set of database operations) to be performed in relation to database 110. For example, executing a database transaction may include executing an SQL SELECT statement to select one or more rows from one or more tables. The contents of a row may be specified in a record 120 and thus a database engine 140 may return one or more records 120 that correspond to those one or more rows. In order to process those database transactions, in various embodiments, a database engine 140 relies on catalog 130. In particular, a database engine 140 may consult catalog objects 136A of catalog 130 (which may be cached in a local in-memory cache of a database node executing that database engine 140) to process and validate the database transactions.

Deployment system 150, in various embodiments, is executable software that is capable of deploying a new version of a database engine 140. For example, database engine 140B may be an updated version of database engine 140A-database engine 140B may include features that are not present in database engine 140A (e.g., the ability to recognize a new column that is added to a table of catalog 130). When deploying the new version of a database engine 140 as a part of an upgrade process, in various embodiments, deployment system 150 selects and executes a deployment plan 175, where the selection is based on a comparison between a set of shape signatures 132 and/or a set of catalog signatures 134. To achieve that end, as shown, deployment system 150 includes signature generator 160, deployment plan selector 170, and deployment module 180. In other embodiments, one or more of these components are included within database engine 140A (that is, the database engine 140 being upgraded).

The illustrated upgrade process is performed by deployment system 150 in response to the occurrence of a trigger event that indicates that an upgrade should be performed. In some embodiments, the trigger event may involve deployment system 150 receiving an upgrade request with new binary catalog information 155 or an upgrade request with the location of the new binary catalog information 155. In various embodiments, binary catalog information 155 is information pertaining to the structure and content of a new version of database catalog 130, such as a header file. Header files are discussed in greater detail with respect to FIG. 2. In other embodiments, deployment system 150 may periodically check an external data repository, and if deployment system 150 detects new binary catalog information 155, it starts the process for upgrading the binaries (e.g., the binary of the database engine) of system 100. When the trigger event occurs, deployment system 150 obtains binary catalog information 155 and provides it to signature generator 160, as shown.

Signature generator 160, in various embodiments, is executable software that generates catalog signatures (shape signature 132B and content signature 134B), using a hash function, based on binary catalog information 155. As an example, shape signature 132B may be a 32-bit value derived based on a set of files that defines the structure (e.g., table columns) of catalog objects 136B, which are associated with database engine 140B (the new version of the database engine). In some embodiments, signature generator 160 may generate signatures representing other features and/or processes of system 100. For example, a signature may be generated that represents a segment of executable code. Signature generator 160 is discussed in greater detail with respect to FIG. 3A and FIG. 3B. As shown, catalog signatures 132B and 134B are provided to deployment plan selector 170.

Deployment plan selector 170, in various embodiments, is software executable to select a deployment plan 175 by comparing the values of catalog signatures 132A and 134A from the current version of catalog 130 to the values of catalog signatures 132B and 134B from the newer version. A deployment plan 175, in various embodiments, is a set of instructions for performing an upgrade process, such as a full upgrade, a minor upgrade, and a binary swap. A difference between shape signatures 132A and 132B indicates that the structure of catalog 130 has changed between versions (that is, the version used by database engine 140A is structurally different from the version that is used by database engine 140B). If deployment plan selector 170 detects a change in the structure, in various embodiments, it selects a deployment plan 175 that implements the full upgrade process. The full upgrade process is discussed in more detail with respect to FIG. 4A. A difference between content signatures 134A and 134B indicates that the content of catalog 130 has changed between versions. If deployment plan selector 170 detects a change in the content of catalog 130 but not the structure, in various embodiments, it selects a deployment plan 175 that implements the minor upgrade process. The minor upgrade process is discussed in more detail with respect to FIG. 4B. If shape signatures 132A and 132B are identical and content signatures 134A and 134B are identical between versions of catalog 130, this indicates that the structure and content are unchanged. Thus, in various embodiments, deployment plan selector 170 selects a deployment plan 175 that implements the binary swap process. The binary swap process is discussed in more detail with respect to FIG. 4C. As shown, selected deployment plan 175 is provided to deployment module 180.

Deployment module 180, in various embodiments, is software executable to facilitate the deployment, scaling, and management of a database engine 140 and catalog 130, according to selected deployment plan 175. As a part of performing an upgrade, deployment module 180 may execute pipelines, based on deployment plan 175, such that components are deployed on or removed from resources of the cloud infrastructure. Resources can include, for example, a set of CPUs, storage devices, virtual machines, physical machines, and network components (e.g., routers). As a part of managing resources, in various embodiments, deployment module 180 maintains environment information about resources and configurations of environment(s) managed by deployment module 180. The environment information can describe, for example, host machines that make up a computer network, their compute resources (e.g., processing and memory capability), the software programs that are running on those machines, and the internal networks of each of the host machines. In various embodiments, deployment module 180 uses the environment information to deploy components. As an example, when deploying database engine 140B, deployment module 180 can implement selected deployment plan 175, including accessing the environment information to determine what resources are available and capable of being used to execute database engine 140B.

Figure 2:
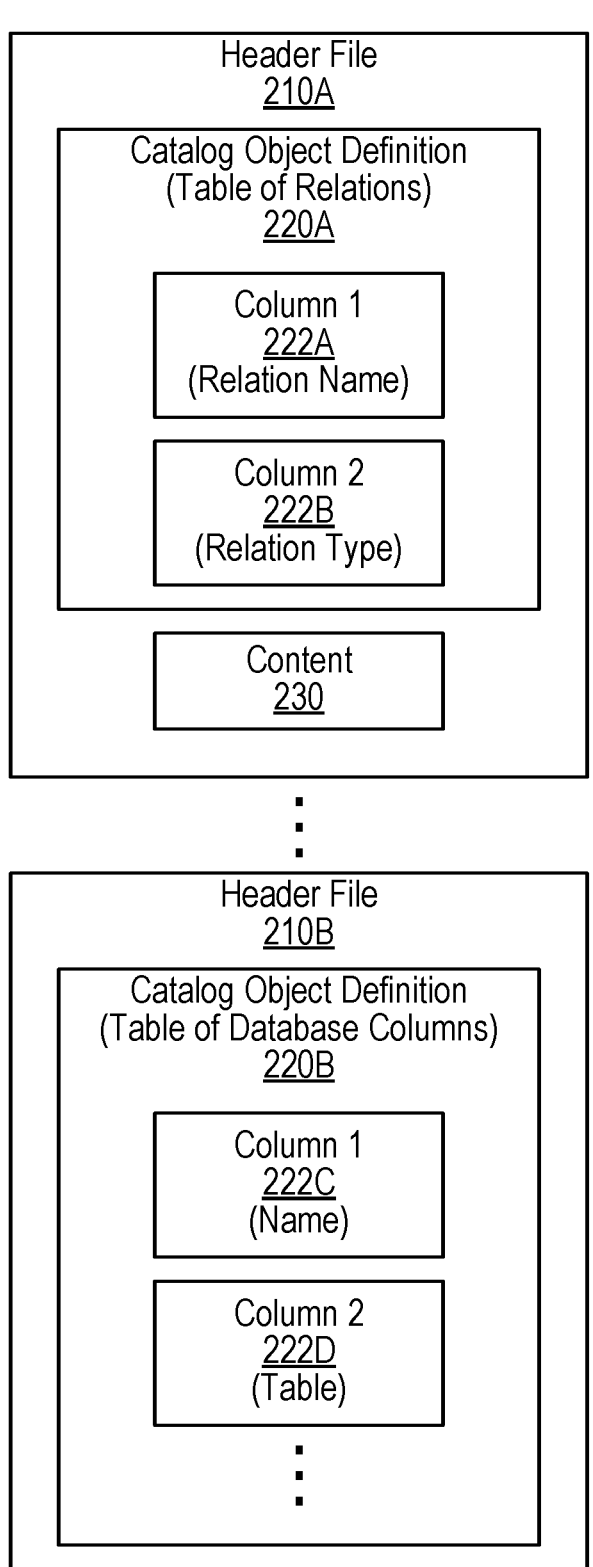
FIG. 2 is a block diagram illustrating example elements of header files that define the structure and content of catalog objects, according to some embodiments.

Turning now to FIG. 2, a block diagram of example header files 210 is shown. In the illustrated embodiment, header file 210A includes a catalog object definition 220A and content 230, and header file 210B include a catalog object definition 220B. As shown, catalog object definition 220A includes column 222A and 222B, and catalog object definition 220B includes column 222C and 222D. In some embodiments, header files 210A and 210B are implemented differently than shown. For example, header files 210A and 210B may describe different types of tables with additional columns 222.

Header files 210 (e.g., pg_prog.h) include catalog object definitions 220 that define the structure of catalog objects 136 (e.g., catalog tables). In the illustrated embodiment, header file 210A includes catalog object definition 220A, which defines the structure for a catalog table, referred to as the "table of relations," that is used to store content defining the relations (e.g., tables, indexes, etc.) of database 110. The structure for the "table of relations" catalog table includes a first column 222A that is defined as the "relation name" and a second column 222B that is defined as the "relation type." The relation name refers to the name given to a relation, and the relation type refers to the type of that relation. For example, a row may be inserted into the "table of relations" catalog table that defines a database table called "user table" of the type "table" (as opposed to other types, such as "index"). Header files 210 may also include content 230 (e.g., rows) associated with catalog objects 136. For example, content 230 of header file 210A may specify records (rows) to insert into the "table of relations" catalog table, such as a record that defines the user table of the previous example.

In the illustrated embodiment, header file 210B includes catalog object definition 220B that defines the structure (e.g., columns 222C and 222D) for a second catalog table, referred to as the "table of database columns," that is used to store content that defines the columns of the database tables that are defined in the "table of relations" catalog table. As shown, the structure for the "table of database columns" catalog table includes a first column 222C that is defined as "name" and a second column 222D that is defined as "table." The name field refers to the name of a given column, and the table field indicates which table includes that column. While not shown, header file 210B may also include content 230 that is inserted into its catalog object 136 (the "table of database columns" catalog table). For example, that content 230 may specify a catalog row defining a column for a user table, where the column has the value "username" under column 222C and the table identifier of the user table under column 222D. As discussed in more detail below, in various embodiments, header files 210 can be used to generate a script having various database commands that are executable to create the catalog objects 136 defined by those header files 210.

Figure 3A:
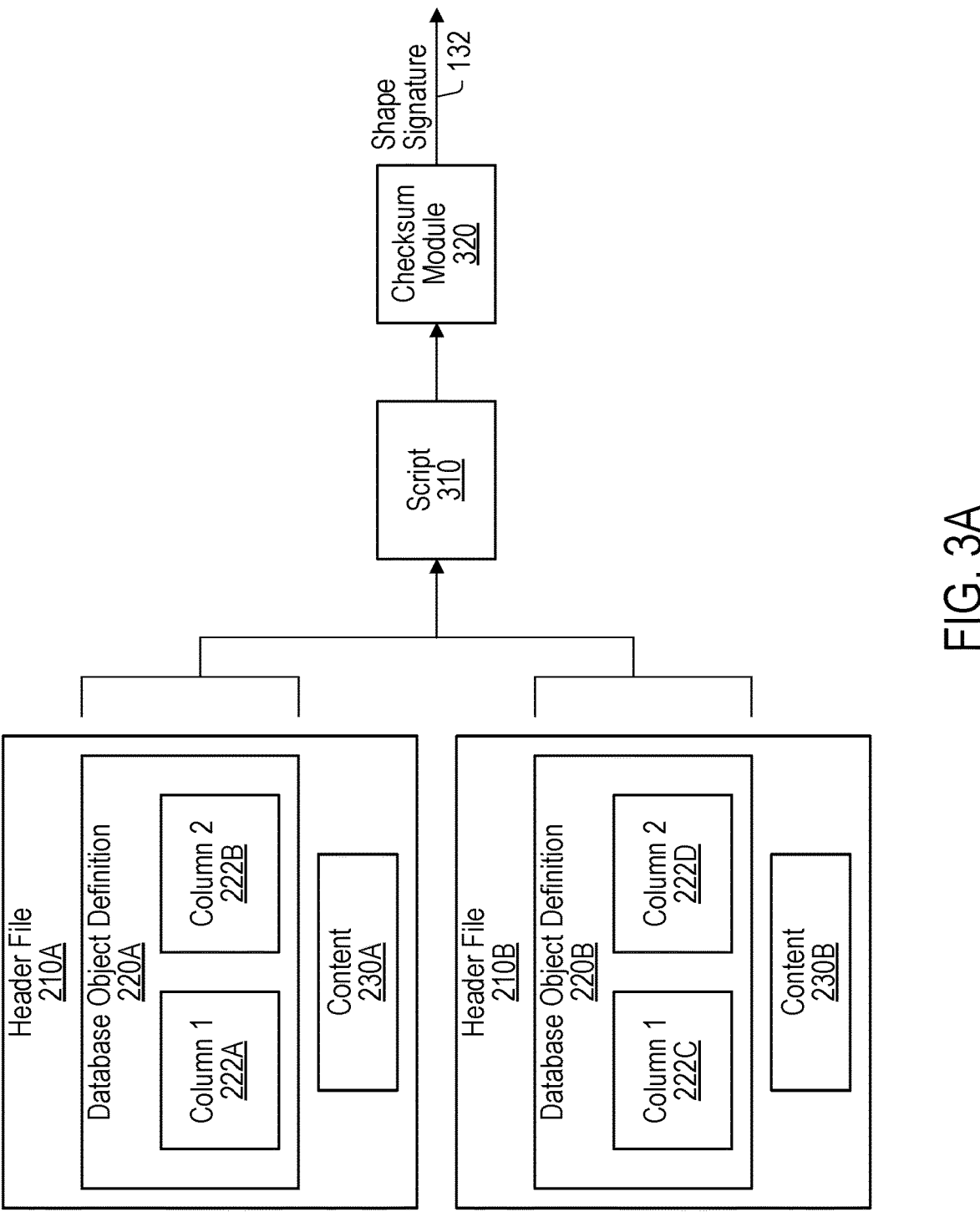
FIG. 3A is a block diagram illustrating example elements involved in the generation of a shape signature based on the structure of a database catalog defined by header files, according to some embodiments.

Turning now to FIG. 3A, a block diagram illustrating an example process for generating a shape signature 132 is shown. In the illustrated embodiment, the process involves header files 210A and 210B, a script 310, and a checksum module 320, which may be a subcomponent of signature generator 160. As further shown, header file 210A includes content 230A and catalog object definition 220A with columns 222A and 222B, and header file 210B includes content 230B and catalog object definition 220B with columns 222C and 222D. In some embodiments, the process is implemented differently than shown. For example, checksum module 320 may receive header files 210 as an input instead of script 310 to generate shape signatures 132.

As shown, header files 210A and 210B are compiled into script 310 based on catalog object definitions 220A and 220B. In other embodiments, script 310 may be generated based on definitions 220 and content 230 or a portion of definitions 220 and content 230, as discussed with respect to FIG. 3B. Script 310, in various embodiments is a set of instructions executable to create catalog objects 136. For example, script 310 may include a series of BKI commands (e.g., create) that are executable to create catalog objects 136 of database catalog 130—thus a Postgres BKI file is an example of script 310. Although FIG. 3A depicts generating script 310 from header files 210A and 210B, script 310 may be generated using a greater or fewer number of header files 210. As depicted, script 310 is provided to checksum module 320 to generate shape signature 132.

Checksum module 320, in various embodiments, is software executable to implement a hash algorithm (e.g., the Fletcher checksum) to compute shape signature 132 based on script 310. As such, shape signature 132 can be a hash value that represents the structure of catalog objects 136. In some embodiments, shape signature 132 may be generated by directly hashing header files 210 or a portion of header files 210 (e.g., a subset of columns 222). Furthermore, checksum module 320 may receive other files (in addition to script 310) and collectively hash those files and script 310 to generate shape signature 132.

Figure 3B:
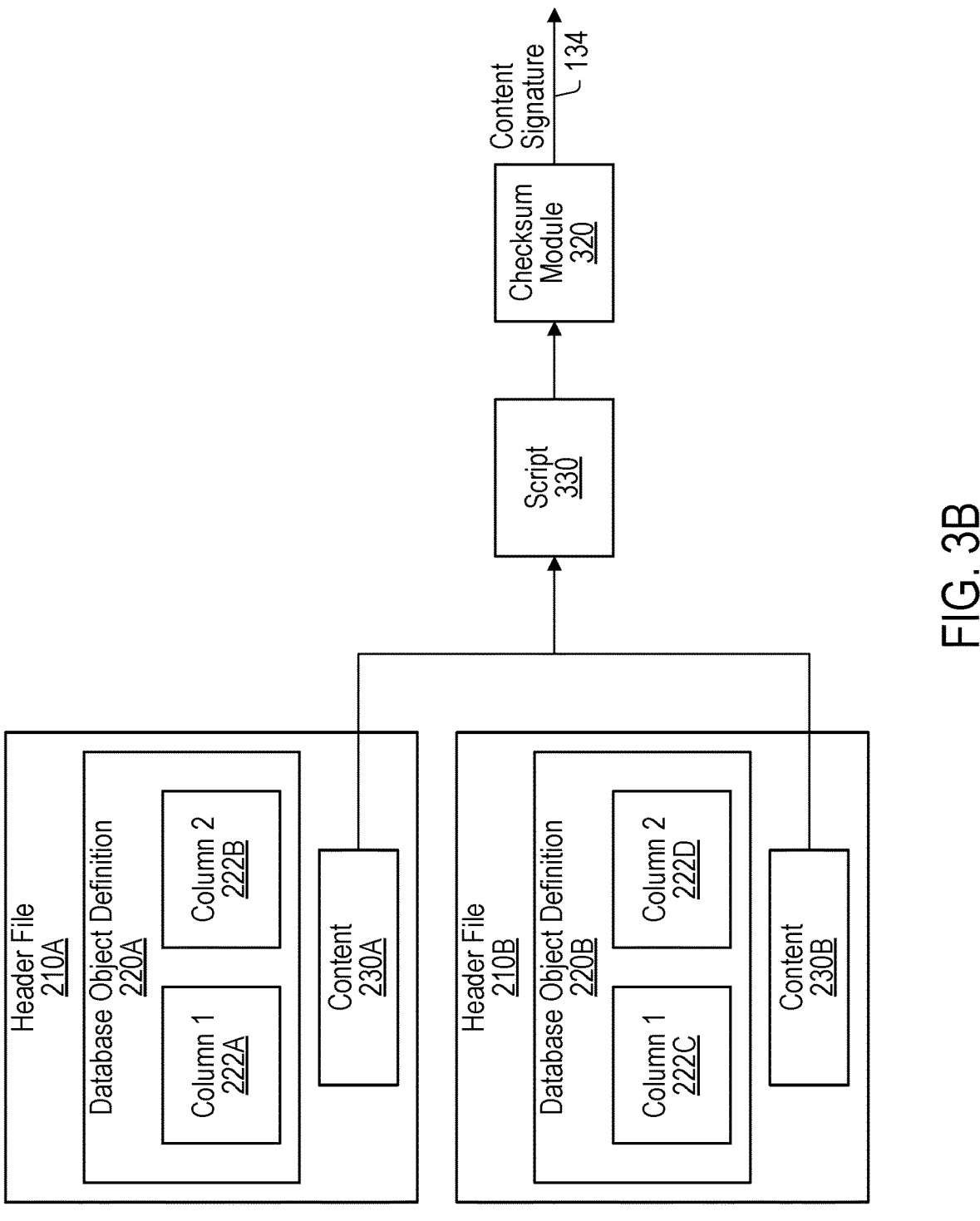
FIG. 3B is a block diagram illustrating example elements involved in the generation of a content signature based on the content of a database catalog defined by header files, according to some embodiments.

Turning now to FIG. 3B, a block diagram illustrating an example process for generating a content signature 134 is shown. In the illustrated embodiment, the process involves header files 210A and 210B, a script 330, and checksum module 320. As further shown, header file 210A includes content 230A and catalog object definition 220A with columns 222A and 222B, and header file 210B includes content 230B and catalog object definition 220B with columns 222C and 222D. In some embodiments, the process is implemented differently than shown. For example, checksum module 320 may receive header files 210 as an input instead of script 330 to generate content signatures 134.

As shown, header files 210A and 210B are compiled into script 330 based on content 230A and 230B. Script 330 may further be generated based on definitions 220 (in addition to content 230A and 230B). In various embodiments, script 330 is a set of instructions executable to insert content 230 into catalog objects 136 of catalog 130—script 330 may also create those catalog objects 136. For example, script 330 may include BKI commands (e.g., open, insert, close, etc.) that are executable to create catalog objects 136 and insert content 230 into them-a Postgres BKI file is an example of script 330. Script 330 may differ from script 310 in that script 330 includes command for inserting content 230 while script 310 includes commands for only creating catalog objects 136. Thus, script 310 may represent the structure of catalog objects 136 while script 330 may represent their structure and content. In some embodiments, script 310 is generated based on a portion of content 230. Although FIG. 3A depicts generating script 310 from header files 210A and 210B, script 310 may be generated using a greater or fewer number of header files 210. As shown, script 310 is provided to checksum module 320 to generate content signature 134.

Checksum module 320 may implement a hash algorithm (e.g., the Fletcher checksum) to compute content signature 134 based on script 330. As such, content signature 134 can be a hash value that represents the content of catalog objects 136. For example, content signature 134 may be 32-bit value that represents the rows of catalog tables of catalog 130. But in some embodiments, content signature 134 may be generated by directly hashing header files 210 or a portion of header files 210. For example, checksum module 320 may hash a subset of content 230 (e.g., set of rows) to generate content signature 134.

Figure 4A:
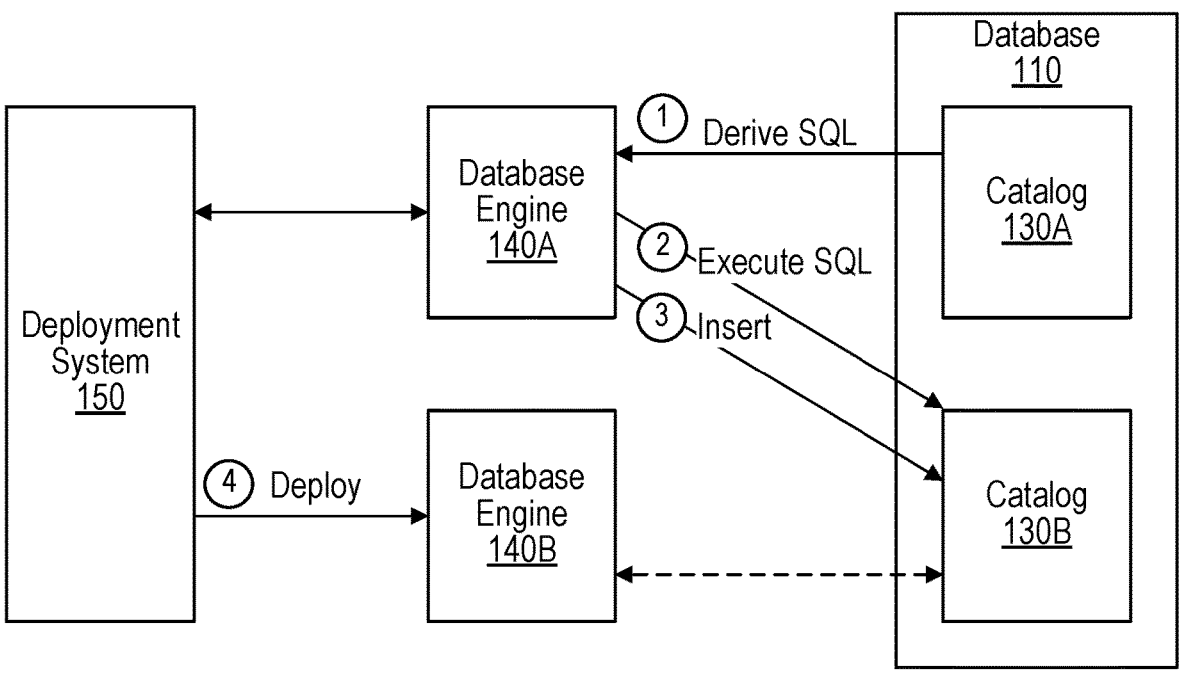
FIG. 4A is a block diagram illustrating a full upgrade process that is executed by the deployment system, according to some embodiments.

Turning now to FIG. 4A, a block diagram illustrating a full upgrade process that can be performed when deploying a new version of a database engine 140 is shown. In the illustrated embodiment, there is deployment system 150, database engine 140A, database engine 140B, and database 110. As further illustrated, database 110 includes catalog 130A (corresponding to the version of the database catalog associated with database engine 140A) and catalog 130B (corresponding to the version of the database catalog associated with database engine 140B, which may be an updated version of database engine 140A). In some embodiments, the full upgrade process is implemented differently than shown. For example, the structure of catalog 130B may be instantiated before the SQL statements are derived from catalog 130A.

The full upgrade process, in various embodiments, is a process that includes rebuilding one or more catalog objects 136 of catalog 130A as catalog objects 136 of catalog 130B and then populating catalog objects 136 of catalog 130B with the content associated with the new version of the database engine 140 (i.e., database engine 140B in FIG. 4A). As discussed, when selecting a deployment plan 175, deployment system 150 compares shape signature 132A (that corresponds to the prior version of the database catalog) and shape catalog signature 132B (that corresponds to the new version) to determine whether the structure of the catalog objects 136 changes between the previous and new version. For example, a new column may be added to an existing catalog table, and as a result, the structural change is detected by a change in value between shape signatures 132A and 132B. If a difference is detected between signature 132A and signature 132B, in various embodiments, deployment system 150 selects the full upgrade process. In some embodiments, signature 132A and signature 132B may be used to detect a structural change for a sub-set of catalog objects 136. For example, if a structural change is detected for a sub-set of catalog tables, deployment system 150 may perform the full upgrade process with respect to the sub-set of objects 136 instead of performing the full upgrade process for all objects 136.

As a part of performing the full upgrade process, in various embodiments, deployment system 150 interact with database engine 140A to execute database statements (e.g., Structure Queary Language (SQL) statements) to create at least a portion of the structure and/or content of catalog 130B. In various cases, deployment system 150 may interact with database engine 140A to extract and derive database statements that are based on the structure and/or content of catalog 130A. Those database statements may then be executed by database engine 140A to create at least a portion of the structure and/or content of catalog 130B. For example, database engine 140A may derive a set of DDL statements for recreating user objects that are a part of catalog 130A and then may execute those DDL statements on catalog 130B to create the user objects for catalog 130B. In some embodiments, deployment system 150 may first cause the structure of catalog 130B to be created and then interact with database engine 140A to create DDL statements that can be used to recreate one or more objects of catalog 130A (e.g., user functions, query plans, etc.). Those DDL statements may then be executed to create those one or more objects for catalog 130B. In various cases, in addition to a structural change, there is a content change. Accordingly, deployment system 150 may insert content, including any new content, into catalog 130B after creating the structure of catalog 130B.

After constructing and populating catalog 130B, deployment module 180 may deploy database engine 140B and associates it with catalog 130B so that it can utilize catalog 130B. Deployment system 150 may pass in metadata about catalog 130B, such as its location, as part of deploying database engine 140B, allowing engine 140B to access catalog 130B. In various embodiments, deployment system 150 may reroute new incoming database traffic to engine 140B and decommission engine 140A. In some embodiments, a sub-set of the depicted steps are executed in parallel or in a different order (e.g., database engine 140B might be deployed before catalog 130B is created and populated). As used herein, the term "parallel" is used in accordance with its well-understood meaning and refers to the execution of two or more processes overlapping at least partially in time.

Figure 4B:
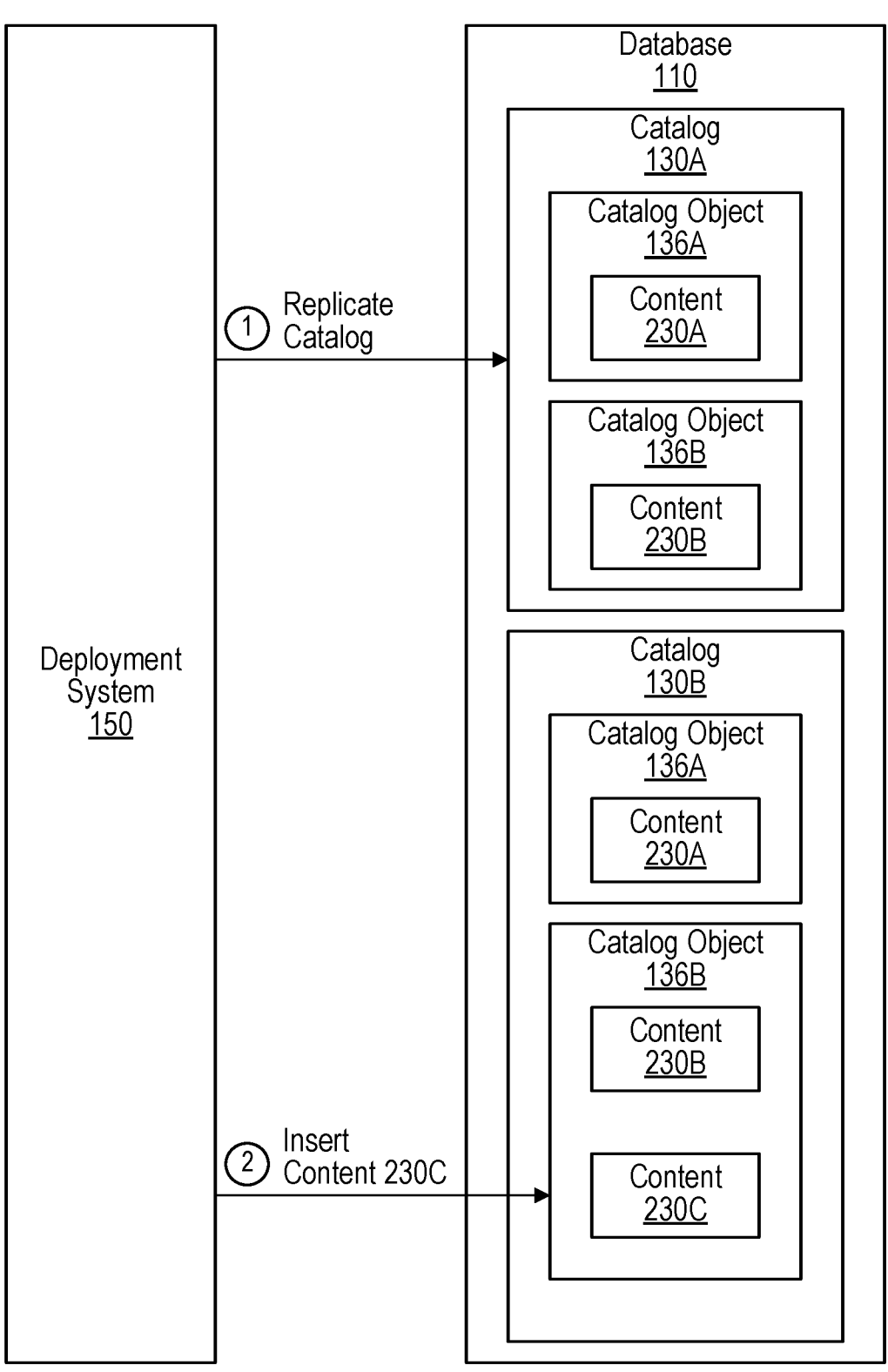
FIG. 4B is a block diagram illustrating a minor upgrade process that is executed by the deployment system, according to some embodiments.

Turning now to FIG. 4B, a block diagram illustrating a minor upgrade process that can be performed when deploying a new version of a database engine is shown. In the illustrated embodiment, there is database engine 120A and database 110 having a catalog 130A and a catalog 130B. As further shown, catalog 130A comprises a catalog object 136A with content 230A and a catalog object 136B with content 230B. After the minor upgrade process, catalog 130B comprises catalog object 136A with content 230A and catalog object 136B with content 230B and 230C.

The minor upgrade process, in various embodiments, is a process that involves copying the content 230 (e.g., content 230A and 230B) associated with the prior version of the database catalog (e.g., catalog 130A) and inserting that content 230 in addition to the new content (e.g., content 230C) into the new version of the database catalog (e.g., catalog 130B). As discussed, when selecting a deployment plan 175, deployment system 150 compares the original content signature 134A and the new content catalog signature 134B to determine if the content of the catalog objects 136 has changed. For example, a new row may be added to an existing catalog table, and as a result, the content change is detected by a change in the values between signature 134A and 134B. In various embodiments, deployment system 150 selects the minor upgrade process if a change is detected between content signature 134A and 134B and if a change is not detected between shape signatures 132A and 132B. In some cases, content signatures 134A and 134B may be used to detect a content change for a sub-set of catalog objects 136. As an example, if a content change is detected for a sub-set of database tables, deployment module 180 may perform the minor upgrade process with respect to the sub-set of objects 136 instead of performing an upgrade process for all objects 136.

As part of performing the minor upgrade process, in various embodiments, deployment system 150 replicates catalog 130A to create catalog 130B (with potentially the assistance of database engine 140A (not illustrated in FIG. 4B)). In the illustrated embodiment, catalog 130B is a shadow catalog that comprises the structure and content of catalog 130A. As an example, deployment system 150 may copy a catalog table, including the columns and rows of that table, into catalog 130B. In some cases, deployment system 150 may first create the catalog table in catalog 130B and then perform a copy operation to copy the content of the corresponding table in catalog 130A to that catalog table of catalog 130B. As shown in FIG. 4B, deployment system 150 replicates catalog 130A, which includes catalog objects 136A and 136B with content 230A and 230B, respectively, as catalog 130B. In some embodiments, deployment system 150 may replicate content from a sub-set of catalog objects 136 and/or replicate a particular segment of content 230 from a catalog object 136 as part of creating catalog 130B. After duplicating the required content from catalog 130A, deployment system 150 may archive catalog 130A in a repository separate from database 110 prior to deleting catalog 130A from database 110. After the content 230 is replicated to catalog 130B, deployment system 150 inserts additional content 230, defined by the different version, into catalog 130B. For example, deployment system 150 may insert an additional row pertaining to a new database table. In the illustrated embodiment, deployment system 150 inserts new content 230C into catalog object 136B.

Furthermore, as part of performing the minor upgrade process, deployment system 150 deploys the new version of the database engine 140 and associates it with catalog 130B so that it can utilize catalog 130B. Deployment system 150 may then route incoming traffic to the new version of the database engine 140 while traffic drains from the prior version of the database engine 140. Once all traffic has drained from that prior version, deployment system 150 may then decommission it, reclaiming resources that had been allocated to it.

Figure 4C:
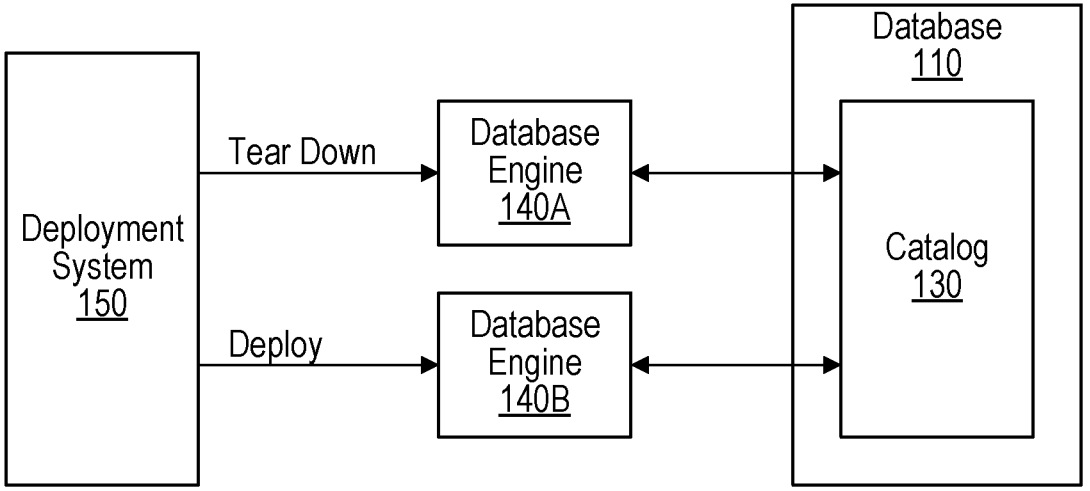
FIG. 4C is a block diagram illustrating a binary swap process that is executed by the deployment system, according to some embodiments.

Turning now to FIG. 4C, a block diagram illustrating a binary swap process that can be performed when deploying a new version of a database engine 140 is shown. In the illustrated embodiment, there is deployment system 150, database engine 140A, database engine 410B, and database 110. As further shown, database 110 includes catalog 130. In some embodiments, the binary swap process is implemented differently than shown.

The binary swap process, in various embodiments, is process that involves deploying a new version of a database engine 140 (i.e., database engine 140B in FIG. 4C) to replace the previous version (i.e., database engine 140A in FIG. 4C) without generating a separate instance of catalog 130. As discussed, when selecting a deployment plan 175, deployment system 150 compares the original set of signatures 132A and 134A with the new catalog signatures 132B and 134B, created by signature generator 160, to determine whether the structure and content of catalog 130 have changed between the new version and the previous version. If both the structure and the content remain unchanged, deployment system 150 selects a deployment plan that includes a set of instructions executable to implement the binary swap upgrade process for replacing the existing database binaries with the database binaries that are associated with the new version of the database engine/application.

As a part of performing the binary swap process, in various embodiments, deployment system 150 deploys database engine 140B, using the database binaries associated with the new version. As a part of that deployment, deployment system 150 may configure database engine 140B and inject metadata to enable database engine 140B to access catalog 130. The metadata may include the location of a metadata store, located separately from database 110, that allows database engine 140B to access information about catalog 130, or the metadata may identify the location of catalog 130 in database 110. Catalog 130 might also be updated to associate it with database engine 140B—e.g., permissions stored in catalog 130 may be updated to permit database engine 140B to access and utilize catalog 130. After deploying database engine 140B, in various embodiments, deployment system 150 tears down/decommissions database engine 140A. As part of the tearing down database engine 140A, new database traffic can be rerouted to database engine 140B instead of database engine 140A. After completing remaining active transactions, in various embodiments, database engine 140A is torn down, and its resources (e.g., computing resources, etc.) are deallocated. As such, database engine 140B now provides database services for application nodes.

Figure 5:
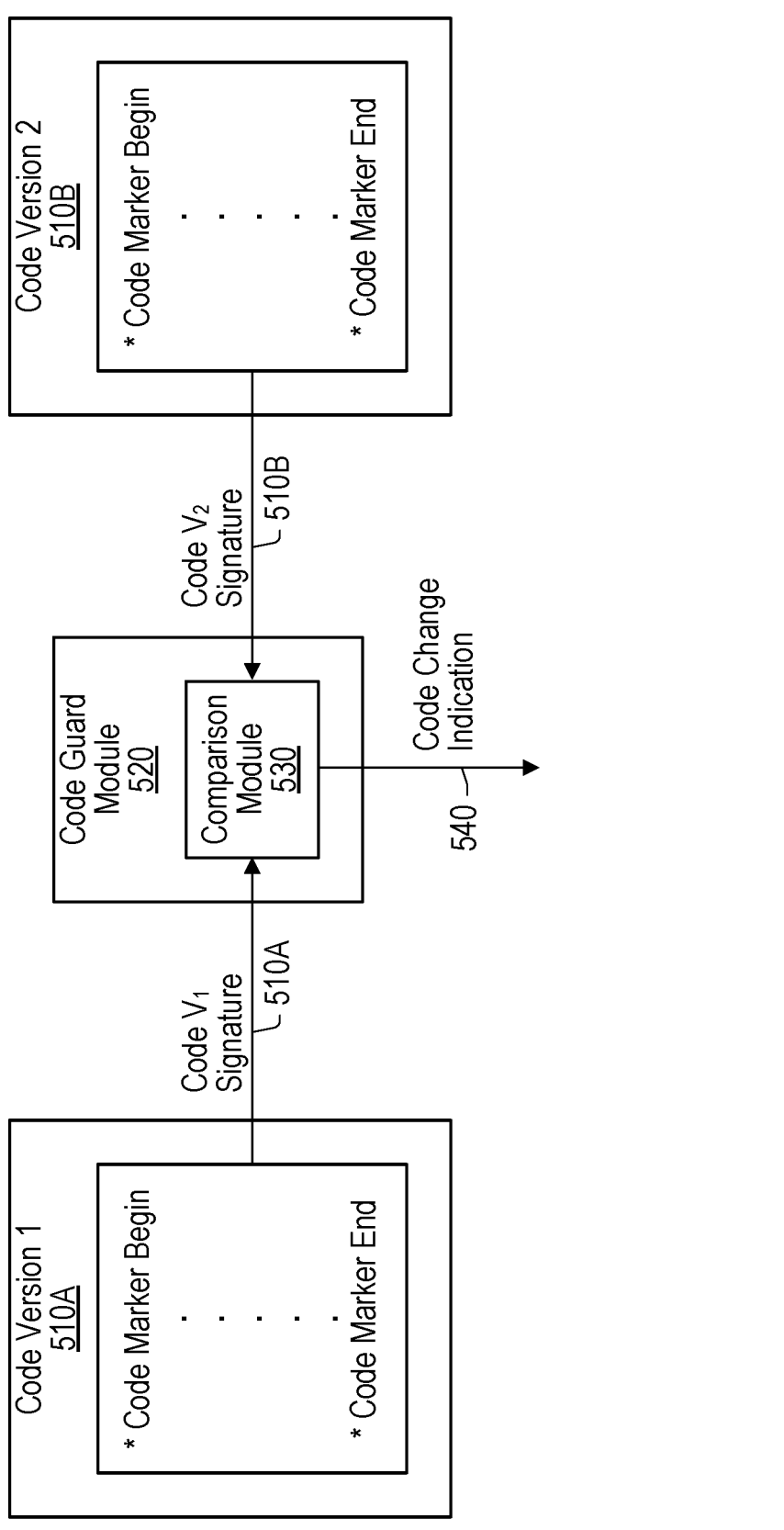
FIG. 5 is a block diagram illustrating example elements involved in the generation of a code change indication based on a set of code signatures, according to some embodiments.

Turning now to FIG. 5, a block diagram of an example code guard module 520 is shown. In the illustrated embodiment, code guard module 520 includes comparison module 530. As further depicted, code guard receives code version 1 ($V_1$) signature 510A and code version two (V2) signature 510B.

Code guard module 520, in various embodiments, is software executable to generate a code change indication 540 based on a comparison between code $V_1$ signature 510A and code $V_2$ signature 510B. A code signature 510, in various embodiments, is a hash value, generated from a hash algorithm (e.g., Fletcher's checksum), that is indicative of a segment of code. For example, code $V_1$ signature 510A may represent a segment of code that is executed when performing the full upgrade process while code $V_2$ signature 510B represents the segment of code for a different version of deployment system 150 and/or a database engine 140. As discussed, the functionality of deployment system 150 may be implemented by a database engine 140. When there is an update to that database engine 140, it may be desirable to determine whether the code for performing any of the upgrade processes has changed from the prior version of the database engine 140. Accordingly, code signatures 510A and 510B may be generated on the same portion of code for both versions of the database engine 140. As shown, code guard module 520 receives and provides code $V_1$ signature 510A and code $V_2$ signature 510B to comparison module 530. Comparison module 530, in various embodiments, compares code $V_1$ signature 510A and code $V_2$ signature 510B, and if module 530 detects a difference between code signatures 510, it generates code change indication 540. Code change indication 540, in various embodiments, is a notification that informs the user of the difference. Code change indication 540 may be provided to another system to alert developers prior to executing selected deployment plan 175.

In some embodiments, comparison module 530 compares catalog images to determine whether the shape and/or content of catalog 130 changes between versions. A catalog image, in various embodiments, captures the columns and rows of the catalog tables as an image. For example, the image may capture a "user ID" and "name" column and a set of rows corresponding to the columns. If the catalog images differ between versions, this indicates that there is a structure and/or content change. In some embodiments, comparison module 530 performs a comparison of catalog images to test shape signatures 132 and content signatures 134. For example, if the images indicate that the content of the catalog 130 has changed between versions, this implies that content signatures 134A and 134B should also differ. If there is a discrepancy in results, comparison module 530 may provide an error, causing the upgrade process to terminate.

Turning now to FIG. 6, a flow diagram of a method 600 is shown. Method 600 is one embodiment of a method performed by a computer system (e.g., system 100) to select one of a plurality of upgrade processes (e.g., selected deployment plan 175) performable to upgrade a database application (e.g., database engine 120A) to a different version (e.g., database engine 140B). Method 600 may be performed by executing a set of program instructions stored on a non-transitory computer-readable medium. Method 600 may include more or less steps than shown. As an example, method 600 may not include step 620 in which the catalog signatures are generated.

Method 600 begins in step 610 with the computer system determining to upgrade the database application to the different version from a current version associated with a first instance of a database catalog (e.g. the version of the database catalog associated with database engine 140A) that defines a structure for a database managed by the database application. The first instance is associated with a first catalog signature (e.g., shape signature 132A or content signature 134A) that is indicative of the first instance of the database catalog.

In step 620, the computer system generates a second catalog signature (e.g., catalog signatures 132B or 134B) that is indicative of a second instance of the database catalog (e.g. the version of the database catalog associated with database engine 140B) that is associated with the different version. The computer system may access catalog information (e.g., binary catalog information 155) that defines a structure and content of the second instance of the database catalog. In various embodiments, the computer system generates a script (e.g., script 310) based on the catalog information (e.g., header files 210), and the script is executable to generate at least a portion of the second instance. The computer system may perform a hash function (e.g., checksum module 320) on the script to generate the second catalog signature. The first catalog signature (e.g., shape signature 132A) may be indicative of a structure (e.g., structure of catalog objects 136A) of the first instance of the database catalog and the second catalog signature (e.g., shape signature 132B) may be indicative of a structure (e.g., structure of catalog objects 136B) of the second instance of the database catalog. The first catalog signature (e.g., content signature 134A) may be indicative of content (e.g., content of catalog objects 136A) of the first instance of the database catalog and the second catalog signature (e.g., content signature 134B) is indicative of content (e.g., content of catalog objects 136B) of the second instance of the database catalog. In various embodiments, the computer system generates two catalog signatures: one indicative of a structure (e.g., structure of catalog objects 136B) of the second instance of the database catalog and one indicative of content (e.g., content of catalog objects 136B) of the second instance of the database catalog.

In step 630, the computer system compares the first catalog signature and the second catalog signature to determine whether the database catalog changes between the current and different versions. In some embodiments, prior to the comparing of the first and second catalog signatures, the computer system compares a first catalog image that represents the first instance of the database catalog and a second catalog image that represents the second instance of the database catalog to determine whether the first and second catalog signatures should match. The first and second catalog signatures may be indicative of structure of the database catalog. Accordingly, the computer system may generate a third catalog signature that is indicative of content of the first instance and a fourth catalog signature that is indicative of content of the second instance. The computer system may compare the third and fourth catalog signatures to determine whether content of the database catalog changes between the current and different versions.

In step 640, the computer system selects, based on the comparing, a particular one of the plurality of upgrade processes performable to upgrade the database application to the different version. The plurality of upgrade processes includes a first type of upgrade process (e.g., a full upgrade), a second type of upgrade process (e.g., a minor upgrade), and a third type of upgrade process (e.g., a binary swap). The computer system may also base the selection on a comparison of third and fourth catalog signatures that are used to determine whether content of the database catalog changes between the current and different versions.

In step 650, the computer system performs the selected particular upgrade process. In response to a structural change of the database catalog between the first and second instances as indicated by a difference between the first and second catalog signatures, the computer system selects the first type of upgrade process as the particular upgrade process. As part of performing the first type of upgrade process, in various embodiments, the computer system derives a plurality of database statements from the first instance of the database catalog. A particular one of the plurality of database statements may be executable to insert particular content of the first instance of the database catalog (e.g., catalog 130A) into the second instance of the database catalog (e.g., catalog 130B). The computer system executes one or more of the plurality of database statements to insert content of the first instance of the database catalog into the second instance of the database catalog.

In response to a content but not structural change of the database catalog between the first and second instances as indicated by a difference between the first and second catalog signatures, the computer system selects the second type of upgrade process as the particular upgrade process. As part of performing the second type of upgrade process, in various embodiments, the computer system performs a copy operation on the first instance of the database catalog to produce the second instance. The second instance includes structure (e.g., catalog objects 136A and 136B) and content (e.g., content 230A and 230B) of the first instance. The computer system inserts, into the second instance, additional content (e.g., content 230C) that is associated with the different version but not associated with the current version of the database application.

In response to the first and second instances of the database catalog being identical as indicated by the first and second catalog signatures matching, the computer system selects the third type of upgrade process as the particular upgrade process. As part of performing the third type of upgrade process, in various embodiments, the computer system deploys the different version of the database application (e.g., database engine 140B) and associates the first instance of the database catalog with the deployed database application such that the deployed database application utilizes the first instance.

In some embodiments, the computer system compares a first upgrade signature (e.g., code vi signature 510A) that is indicative of code of the particular upgrade process associated with the current version and a second upgrade signature (e.g., code $V_2$ signature 510B) that is indicative of code of the particular upgrade process associated with the different version to determine whether the particular upgrade process changes between the current and different versions. Based on the first upgrade signature being different than the second upgrade signature, the computer system may provide a notification (e.g., code change indication 540) to the user that the particular upgrade process has changed.

Exemplary Computer System

Figure 7:
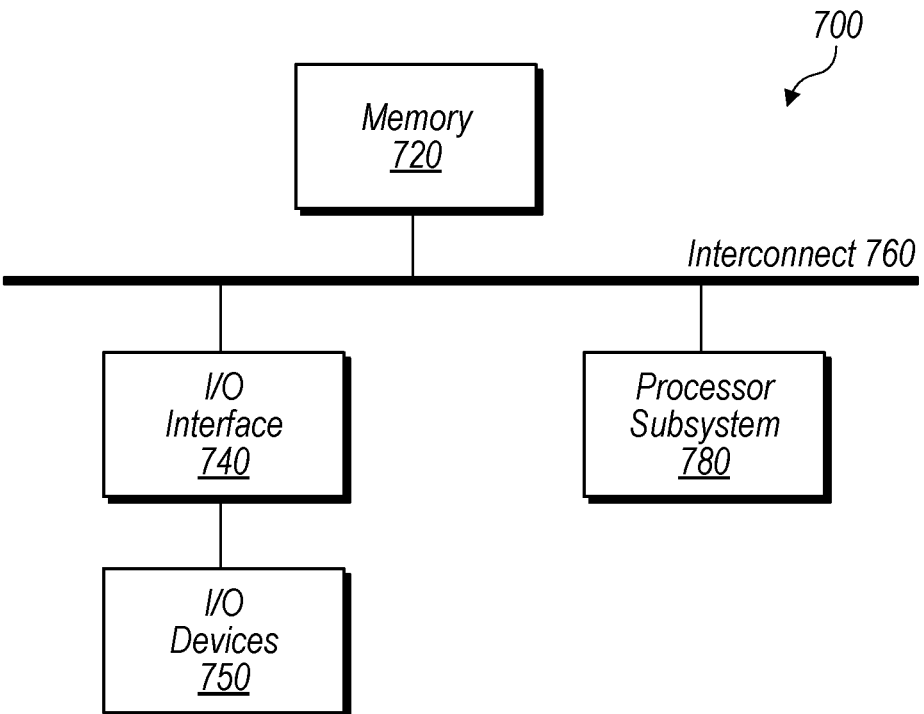
FIG. 7 is a block diagram illustrating elements of a computer system for implementing various systems described in the present disclosure, according to some embodiments.

Turning now to FIG. 7, a block diagram of an exemplary computer system 700, which may implement system 100, database 110, and/or deployment system 150 is shown. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database 110, a database engine 140, and deployment system 150 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

What is claimed is:
1. A method for selecting an upgrade process for a database application, the method comprising:

determining, by a computer system, to upgrade the database application to a different version from a current version associated with a first instance of a database catalog for a database managed by the database application, wherein the first instance is associated with a first shape signature indicative of a structure of the first instance and a first content signature indicative of content of the first instance;

generating, by the computer system, a second shape signature indicative of a structure of a second instance of the database catalog that is associated with the different version and a second content signature indicative of content of the second instance;

comparing, by the computer system, the first and second shape signatures and the first and second content signatures to determine whether the database catalog undergoes a structural change or a content but not structural change between the current and different versions;

based on whether the database catalog undergoes the structural change or the content but not structural change between the current and different versions, the computer system selecting one of a plurality of upgrade processes to upgrade the database application to the different version; and performing, by the computer system, the selected upgrade process.

2. The method of claim 1, wherein the generating further includes:

accessing, by the computer system, catalog information that defines the structure and content of the second instance of the database catalog;

generating, by the computer system, a script based on the catalog information, wherein the script is executable to generate at least a portion of the second instance; and performing, by the computer system, a hash-based operation on the script to generate the second shape signature.

3. The method of claim 1 wherein the plurality of upgrade processes includes a first type of upgrade process, a second type of upgrade process, and a third type of upgrade process.

4. The method of claim 3, further comprising:

in response to the structural change of the database catalog between the first and second instances as indicated by a difference between the first and second shape signatures, the computer system selecting the first type of upgrade process as the selected upgrade process, wherein performing the first type of upgrade process includes:

deriving a plurality of database statements from the first instance of the database catalog, wherein a particular one of the plurality of database statements is executable to insert particular content of the first instance of the database catalog into the second instance of the database catalog; and executing one or more of the plurality of database statements to insert content of the first instance of the database catalog into the second instance of the database catalog.

5. The method of claim 3, further comprising:

in response to the content but not structural change of the database catalog between the first and second instances as indicated by a difference between the first and second content signatures, the computer system selecting the second type of upgrade process as the selected upgrade process, wherein performing the second type of upgrade process includes:

performing a copy operation on the first instance of the database catalog to produce the second instance, wherein the second instance includes structure and content of the first instance; and inserting, into the second instance, additional content that is associated with the different version but not associated with the current version of the database application.

6. The method of claim 3, further comprising:

in response to the first and second instances of the database catalog being identical as indicated by the first and second shape signatures matching and the first and second content signatures matching, the computer system selecting the third type of upgrade process as the selected upgrade process, wherein performing the third type of upgrade process includes:

deploying the different version of the database application; and associating the first instance of the database catalog with the deployed database application such that the deployed database application utilizes the first instance.

7. The method of claim 1, further comprising:

comparing, by the computer system, a first upgrade signature that is indicative of code of the selected upgrade process associated with the current version and a second upgrade signature that is indicative of code of the selected upgrade process associated with the different version to determine whether the selected upgrade process changes between the current and different versions; and based on the first upgrade signature being different than the second upgrade signature, the computer system providing a notification to a user that the selected upgrade process has changed.

8. The method of claim 1, wherein the performing further includes:

prior to the comparing, the computer system comparing a first catalog image that represents the first instance of the database catalog and a second catalog image that represents the second instance of the database catalog to determine whether the first and second shape signatures should match and the first and second content signatures should match.

9. A non-transitory computer-readable medium having program instructions stored thereon that are capable of causing a computer system to perform operations comprising:

determining to upgrade a database application to a different version from a current version associated with a first instance of a database catalog for a database managed by the database application, wherein the first instance is associated with a first shape signature indicative of a structure of the first instance and a first content signature indicative of content of the first instance;

generating a second shape signature indicative of a structure of a second instance of the database catalog that is associated with the different version and a second content signature indicative of content of the second instance;

comparing the first and second shape signatures and the first and second content signatures to determine whether the database catalog undergoes a structural change or a content but not structural change between the current and different versions;

based on whether the database catalog undergoes the structural change or the content but not structural change between the current and different versions, selecting one of a plurality of upgrade processes to upgrade the database application to the different version; and performing the selected upgrade process.

10. The non-transitory computer-readable medium of claim 9, wherein the operations further comprise:

in response to the structural change of the database catalog between the first and second instances as indicated by a difference between the first and second shape signatures, selecting a full upgrade process as the selected upgrade process, wherein performing the full upgrade process includes:

deriving a plurality of database statements from the first instance of the database catalog; and executing one or more of the plurality of database statements to recreate at least a portion of the first instance of the database catalog for the second instance of the database catalog.

11. The non-transitory computer-readable medium of claim 9, wherein the operations further comprise:

in response to the content but not structural change of the database catalog between the first and second instances as indicated by a difference between the first and second content signatures, selecting a minor upgrade process as the selected upgrade process, wherein performing the minor upgrade process includes:

performing a copy operation on the first instance of the database catalog to produce the second instance, wherein the second instance includes structure and content of the first instance; and inserting, into the second instance, additional content that is associated with the different version but not associated with the current version of the database application.

12. A system, comprising:

at least one processor; and memory having program instructions stored thereon that are executable by the at least one processor to cause the system to perform operations comprising:

determining to upgrade a database application to a different version from a current version associated with a first instance of a database catalog for a database managed by the database application, wherein the first instance is associated with a first shape signature indicative of a structure of the first instance and a first content signature indicative of content of the first instance;

generating a second shape signature indicative of a structure of a second instance of the database catalog that is associated with the different version and a second content signature indicative of content of the second instance;

comparing the first and second shape signatures and the first and second content signatures to determine whether the database catalog undergoes a structural change or a content but not structural change between the current and different versions;

based on whether the database catalog undergoes the structural change or the content but not structural change between the current and different versions, selecting one of a plurality of upgrade processes to upgrade the database application to the different version; and performing the selected upgrade process.

13. The system of claim 12, wherein the selected upgrade process is selected over other ones of the plurality of upgrade processes in response to the structural change of the database catalog between the first and second instances as indicated by a difference between the first and second shape signatures, and wherein the performing of the selected upgrade process includes:

deriving a plurality of database statements from the first instance of the database catalog; and executing one or more of the plurality of database statements to recreate particular content of the first instance of the database catalog for the second instance of the database catalog.

14. The system of claim 12, wherein the selected upgrade process is selected over other ones of the plurality of upgrade processes in response to the content but not structural change of the database catalog between the first and second instances as indicated by a difference between the first and second content signatures, and wherein the performing of the selected upgrade process includes:

performing a copy operation on the first instance of the database catalog to produce the second instance; and inserting, into the second instance, additional content that is associated with the different version but not associated with the current version of the database application.

* * * * *